United States Patent
Lou

(10) Patent No.: US 9,329,427 B2
(45) Date of Patent: May 3, 2016

(54) COLOR FILTER SUBSTRATE, DISPLAY PANEL AND DISPLAY DEVICE

(71) Applicants: Shanghai Tianma Micro-Electronics Co., Ltd., Shanghai (CN); Tianma Micro-Electronics Co., Ltd., Shenzhen (CN)

(72) Inventor: Tenggang Lou, Shanghai (CN)

(73) Assignees: Shanghai Tianma Micro-Electronics Co., Ltd., Shanghai (CN); Tianma Micro-Electronics Co., Ltd., Shenzhen (CN)

( * ) Notice: Subject to any disclaimer, the term of this patent is extended or adjusted under 35 U.S.C. 154(b) by 0 days.

(21) Appl. No.: 14/304,784

(22) Filed: Jun. 13, 2014

(65) Prior Publication Data

US 2015/0212366 A1 Jul. 30, 2015

(30) Foreign Application Priority Data

Jan. 29, 2014 (CN) .......................... 2014 1 0042671

(51) Int. Cl.
G02F 1/1333 (2006.01)
G02F 1/1335 (2006.01)
G02B 5/20 (2006.01)
G02F 1/1362 (2006.01)

(52) U.S. Cl.
CPC .......... *G02F 1/133512* (2013.01); *G02B 5/201* (2013.01); *G02F 1/133514* (2013.01); *G02B 2207/121* (2013.01); *G02F 1/136204* (2013.01); *G02F 2202/22* (2013.01)

(58) Field of Classification Search
None
See application file for complete search history.

(56) References Cited

U.S. PATENT DOCUMENTS

| 2011/0063549 A1 | 3/2011 | Eom |
| 2013/0088672 A1 | 4/2013 | Shin et al. |
| 2015/0116605 A1* | 4/2015 | Huang et al. .................... 349/12 |

FOREIGN PATENT DOCUMENTS

| CN | 102023408 A | 4/2011 |
| CN | 102193222 A | 9/2011 |
| CN | 202563650 U | 12/2012 |
| CN | 102981322 A | 3/2013 |
| CN | 103048824 A | 4/2013 |
| CN | 202948225 U | 5/2013 |
| KR | 20030058721 A | 7/2003 |
| KR | 20070068496 A | 7/2007 |
| KR | 20070077349 A | 7/2007 |

OTHER PUBLICATIONS

1st Office Action as received in corresponding Chinese Application No. 201410042671.4, dated Jan. 22, 2016.

* cited by examiner

*Primary Examiner* — Richard Kim
(74) *Attorney, Agent, or Firm* — Alston & Bird LLP

(57) ABSTRACT

A color filter substrate, a display panel and a display device are provided. The color filter substrate includes a first substrate, a black matrix layer located on the first substrate, and an electrostatic discharge wire layer located on the black matrix layer and connected to the black matrix layer. In the color filter substrate, the display panel and the display device, the electrostatic discharge wire layer is arranged on the black matrix layer of the color filter substrate. Hence, static electricity in the color filter substrate is discharged via the electrostatic discharge wire layer, and accordingly, the static electricity may not be accumulated in the color filter substrate, thereby improving the quality and performance of a display.

5 Claims, 9 Drawing Sheets

COLOR FILTER SUBSTRATE, DISPLAY PANEL AND DISPLAY DEVICE

CROSS-REFERENCES TO RELATED APPLICATIONS

The application claims the priority to Chinese Patent Application No. 201410042671.4, entitled "COLOR FILTER SUBSTRATE, DISPLAY PANEL AND DISPLAY DEVICE", filed on Jan. 29, 2014 with the State Intellectual Property Office of People's Republic of China, the content of which is incorporated herein by reference in its entirety.

TECHNICAL FIELD

The disclosure relates to display technologies, and in particular, to a color filter substrate, a display panel and a display device.

BACKGROUND OF THE INVENTION

Currently, display devices such as Liquid Crystal Displays (LCD) and Organic Light-Emitting Diode Displays (OLED) have a large market share of display devices thanks to the advantages of small size, light weight, thin profile, low power consumption, no radiation, etc.

However, in practice, static electricity may be accumulated in the display device (especially in a color filter substrate), resulting in decreased quality and performance of a display.

BRIEF SUMMARY OF THE INVENTION

Embodiments of the present invention provide a color filter substrate, a display panel and a display device for solving the problems of static electricity.

According to an embodiment, a color filter substrate includes a first substrate, a black matrix layer located on the first substrate, and an electrostatic discharge wire layer located on the black matrix layer and connected to the black matrix layer.

According to another embodiment, a display panel includes the foregoing color filter substrate, a TFT array substrate arranged facing the color filter substrate, and a junction layer arranged between the TFT array substrate and the color filter substrate. The junction layer is connected to the electrostatic discharge wire layer.

According to yet another embodiment, a display device includes the foregoing display panel.

DETAILED DESCRIPTION OF THE PREFERRED EMBODIMENTS

Embodiments of the disclosure are described hereinafter in conjunction with the accompanying drawings to provide a better understanding of the nature and advantages of the disclosure.

It should be noted that, in the case that an element X is located on an element Y, it merely refers to a positional relationship between the elements X and Y in a layer structure, rather than indicates that the element Y is completely covered by the element X. Of course, according to some embodiments, the element Y may be completely covered by the element X. Any expression of "located on" in the specification may be referred to this reference.

It should be noted that, arrangements of first electrostatic discharge wires and second electrostatic discharge wires are not limited in the disclosure. The arrangements of the first electrostatic discharge wires and the second electrostatic discharge wires described in the embodiments and the drawings are only exemplary. For example, a projection of the first electrostatic discharge wires onto a first substrate is included in a projection of a first black matrix onto the first substrate; and a projection of the second electrostatic discharge wires onto the first substrate is included in a projection of a second black matrix onto the first substrate.

Figure 1:
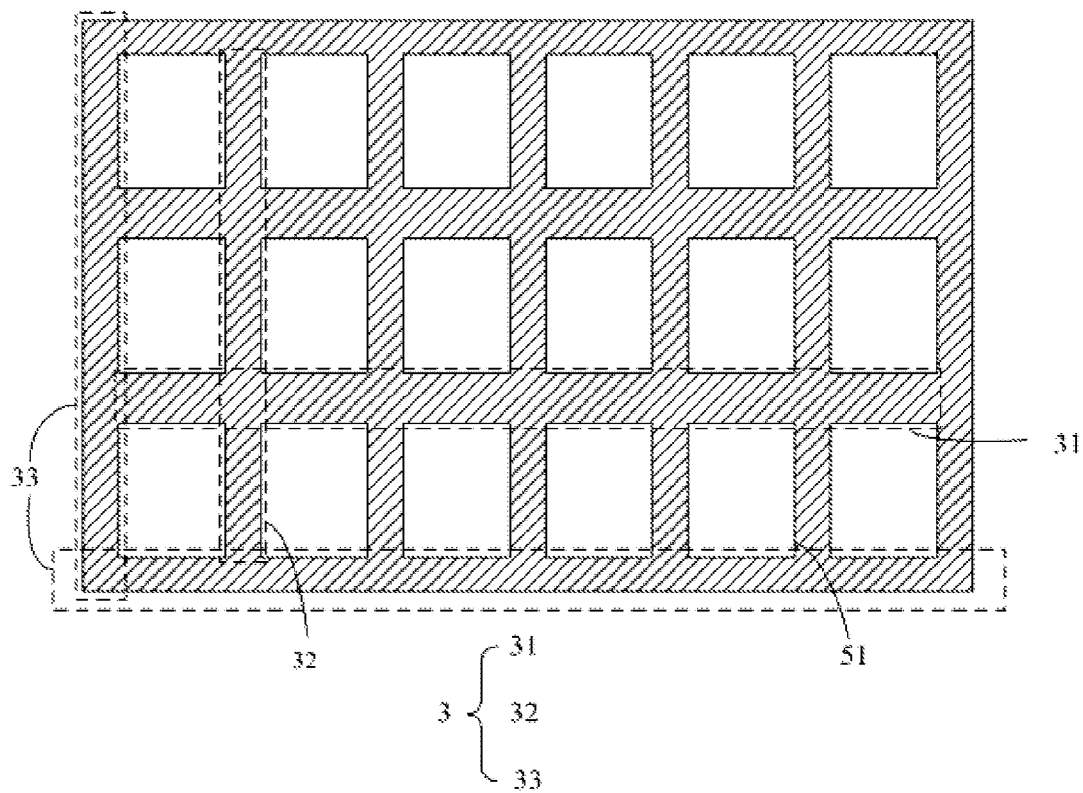
FIG. 1 is a plan view of a black matrix layer of a color filter substrate according to a first embodiment of the disclosure.
Figure 2:
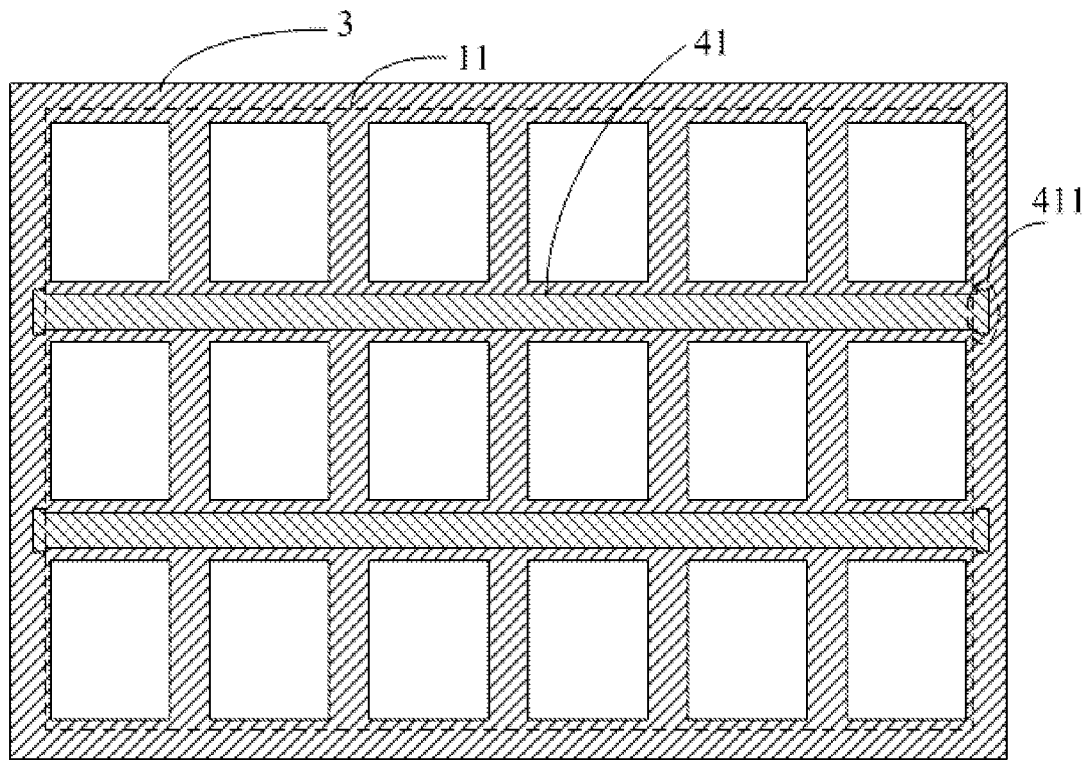
FIG. 2 is a plan view of the color filter substrate according to the first embodiment of the disclosure.
Figure 3A:
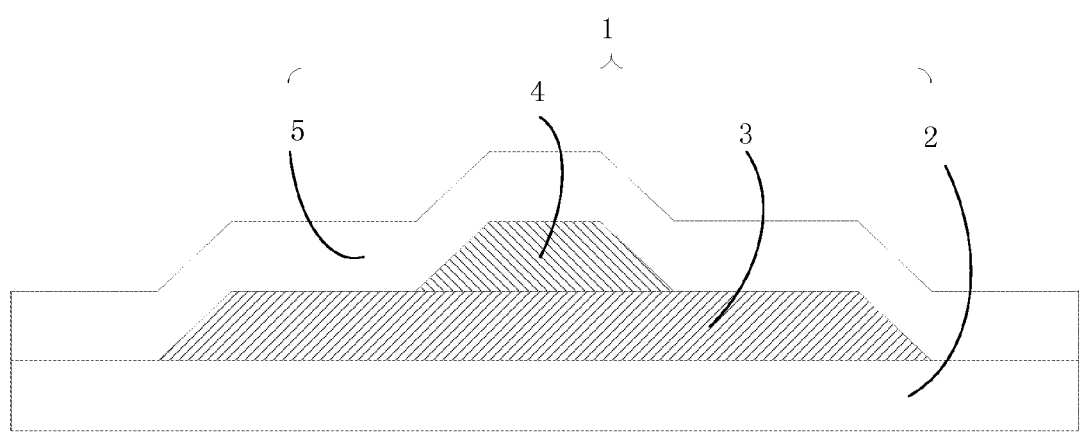
FIG. 3a and FIG. 3b are schematic structural diagrams of the color filter substrate shown in FIG. 2.
Figure 3B:
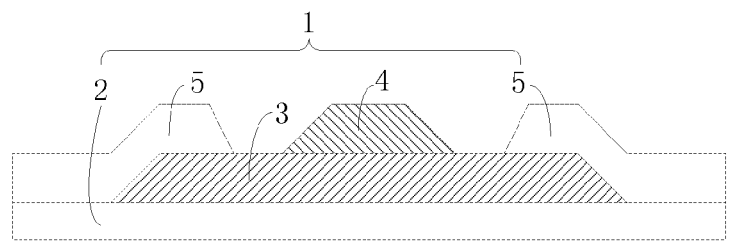

A color filter substrate is provided according to a first embodiment of the disclosure. As shown in FIG. 1, FIG. 2 and FIG. 3a, the color filter substrate 1 includes a first substrate 2, a black matrix layer 3 located on the first substrate 2, an electrostatic discharge wire layer 4, and a color resist layer 5 located on the black matrix layer 3. The electrostatic discharge wire layer 4 is located on the black matrix layer 3 and connected to the black matrix layer 3. The electrostatic discharge wire layer 4 may not be seen when a user observes the color filter substrate 1 at a side of the first substrate 2 away from the electrostatic discharge wire layer 4. The color resist layer 5 includes multiple color resist units 51. The black matrix layer 3 has a multitude of openings (not shown in FIGS. 2, 3 and 3a) through which the color resist units 51 are exposed. The black matrix layer 3 is made of Cr, CrO, and the like, and the electrostatic discharge wire layer 4 is made of conductive materials such as a metal.

FIG. 3a illustrates a general structure of the color filter substrate 1. The color resist layer 5 includes multiple color resist stripes (not shown in FIG. 3a), and each color resist stripe is continuous. The color resist layer 5 is located on the black matrix layer 3 and covers the electrostatic discharge wire layer 4. Alternatively, the color filter substrate 1 may have a structure shown in FIG. 3b. The color resist stripes may be discontinuous, in other words, the color resist stripes may have openings, and the electrostatic discharge wire layer 4 is arranged through the openings.

Furthermore, as shown in FIGS. 1 and 2, the color filter substrate 1 includes a display area 11 and a non-display area (not shown in FIGS. 1 and 2). The black matrix layer 3 includes a first black matrix 31 and a second black matrix 32 intersecting with each other. Generally, the first black matrix 31 and the second black matrix 32 intersect with each other to form grids. The first black matrix 31 is arranged parallel to gate lines of a TFT array substrate to cover the gate lines. The second black matrix 32 is arranged parallel to data lines of the TFT array substrate to cover the data lines. Alternatively, the first black matrix 31 may be arranged parallel to the data lines of the TFT array substrate to cover the data lines, and the second black matrix 32 may be arranged parallel to the gate lines of the TFT array substrate to cover the gate lines.

The electrostatic discharge wire layer 4 includes a multitude of first electrostatic discharge wires 41. The first electrostatic discharge wires 41 are located on the first black matrix 31 and connected to the first black matrix 31. The first black matrix 31 and the first electrostatic discharge wires 41 are located in the display area 11. The first electrostatic discharge wires 41 are arranged parallel to the first black matrix 31. A projection of the first electrostatic discharge wires 41 onto the first substrate 2 is included in a projection of the first black matrix 31 onto the first substrate 2.

Optionally, the electrostatic discharge wire layer 4 further includes first electrostatic discharge terminals 411 connected to the first electrostatic discharge wires 41. The first electrostatic discharge terminals 411 are located in the non-display area. According to an embodiment, each end of each first electrostatic discharge wire 41 is connected to one first electrostatic discharge terminal 411. According to other embodiment, at least one end of the first electrostatic discharge wire 41 is connected to the first electrostatic discharge terminal 411, which is not limited in the disclosure. According to the embodiment, static electricity in the color filter substrate 1 is discharged via the first electrostatic discharge wires 41 and the first electrostatic discharge terminals 411. Generally, the first electrostatic discharge terminals 411 are electrically connected to a ground electrode (not shown in FIGS. 1, 2 and 3a). In this way, the static electricity may not be accumulated in the color filter substrate 1, thereby improving the performance of a display.

Figure 4:
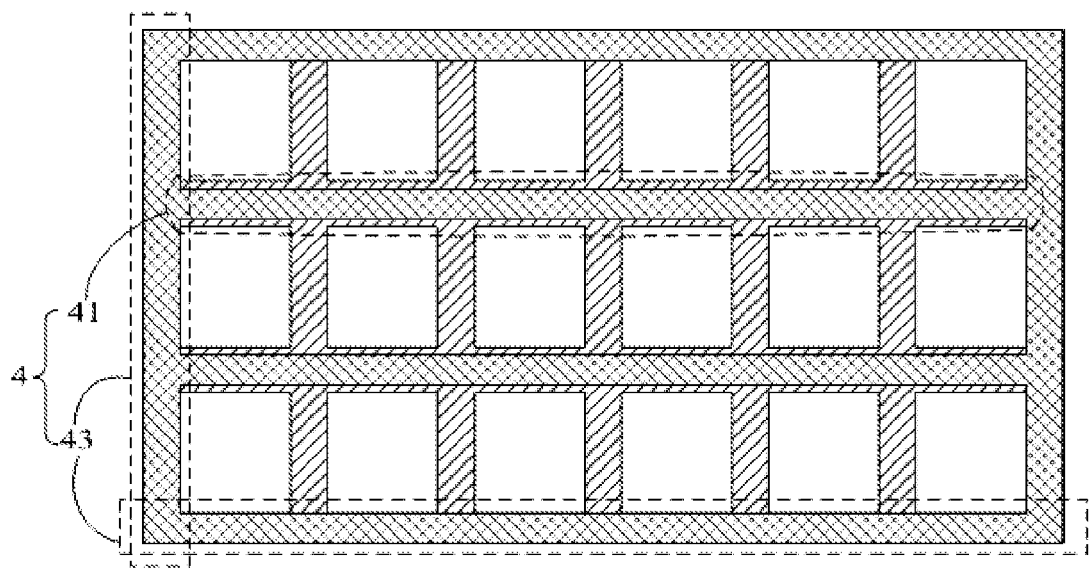
FIG. 4 is another plan view of the color filter substrate according to the first embodiment of the disclosure.

Optionally, as shown in FIG. 1, FIG. 3a and FIG. 4, the black matrix layer 3 further includes a third black matrix 33 located in the non-display area. The electrostatic discharge wire layer 4 further includes a plurality of third electrostatic discharge wires 43 located on the third black matrix 33 and connected to the third black matrix 33. The third electrostatic discharge wires 43 are located in the non-display area. The first electrostatic discharge wires 41 are connected to the third electrostatic discharge wires 43. The static electricity in the first electrostatic discharge wires 41 may be discharged to the third electrostatic discharge wires 43. Generally, the third electrostatic discharge wires 43 are electrically connected to a ground electrode (not shown in FIGS. 1, 3a and 4). A projection of the third electrostatic discharge wires 43 onto the first substrate 2 is included in a projection of the third black matrix 33 onto the first substrate 2. Generally, the third black matrix 33 forms a frame and the third electrostatic discharge wires 43 may also form a frame. The third electrostatic discharge wires 43 may form a closed frame or an unclosed frame, which is not limited according to the embodiment of the disclosure.

Furthermore, according to an embodiment, the first electrostatic discharge wires 41 may be continuous. According to another embodiment, the first electrostatic discharge wires may be discontinuous.

In the color filter substrate 1 according to the embodiment of the disclosure, the electrostatic discharge wire layer 4 is arranged on the black matrix layer 3 of the color filter substrate 1. Hence, the static electricity in the color filter substrate 1 (especially the static electricity in the black matrix layer 3) is discharged via the electrostatic discharge wire layer 4, and accordingly, the static electricity may not be accumulated on the color filter substrate 1, thereby improving the quality and performance of a display.

Figure 5:
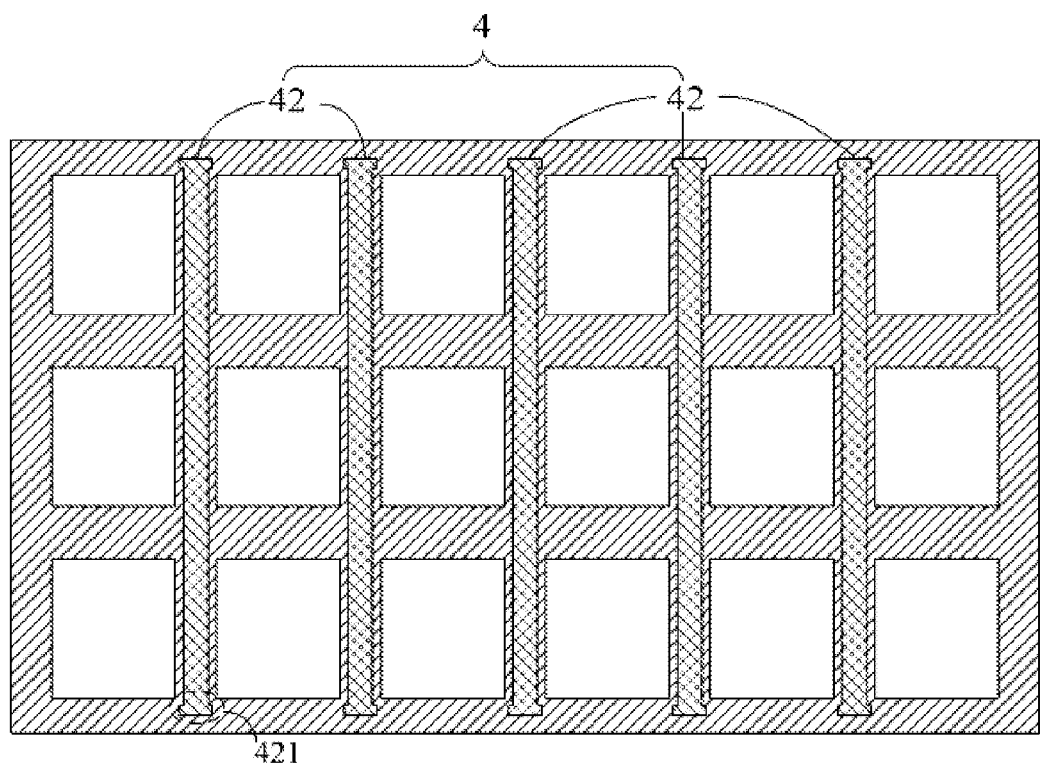
FIG. 5 is a plan view of a color filter substrate according to a second embodiment of the disclosure.

A color filter substrate is further provided according to a second embodiment of the disclosure. The components or elements of the color filter substrates of the second embodiment that are the same as those of the first embodiment are not described herein for the sake of brevity. As shown in FIG. 1, FIG. 3a and FIG. 5, according to the second embodiment, the electrostatic discharge wire layer 4 includes a multitude of second electrostatic discharge wire 42. The second electrostatic discharge wires 42 are located on the second black matrix 32 and connected to the second black matrix 32. The second black matrix 32 and the second electrostatic discharge wires 42 are located in the display area 11. A projection of the second electrostatic discharge wires 42 onto the first substrate 2 is included in a projection of the second black matrix 32 onto the first substrate 2. The second electrostatic discharge wires 42 may be arranged parallel to the second black matrix 32.

Optionally, the electrostatic discharge wire layer 4 further includes a multitude of second electrostatic discharge terminals 421 connected to the second electrostatic discharge wires 42. The second electrostatic discharge terminals 421 are located in the non-display area. According to certain embodiments, each end of each second electrostatic discharge wire 42 is connected to one second electrostatic discharge terminal 421. According to other embodiments, at least one end of the second electrostatic discharge wire 42 is connected to the second electrostatic discharge terminal 421, which is not limited in the disclosure. According to the embodiment, static electricity in the color filter substrate 1 is discharged via the second electrostatic discharge wires 42 and the second electrostatic discharge terminals 421. Generally, the second electrostatic discharge terminals 421 are electrically connected to a ground electrode (not shown in FIGS. 1, 3a and 4). In this way, the static electricity may not be accumulated in the color filter substrate, thereby improving the performance of display.

Figure 6:
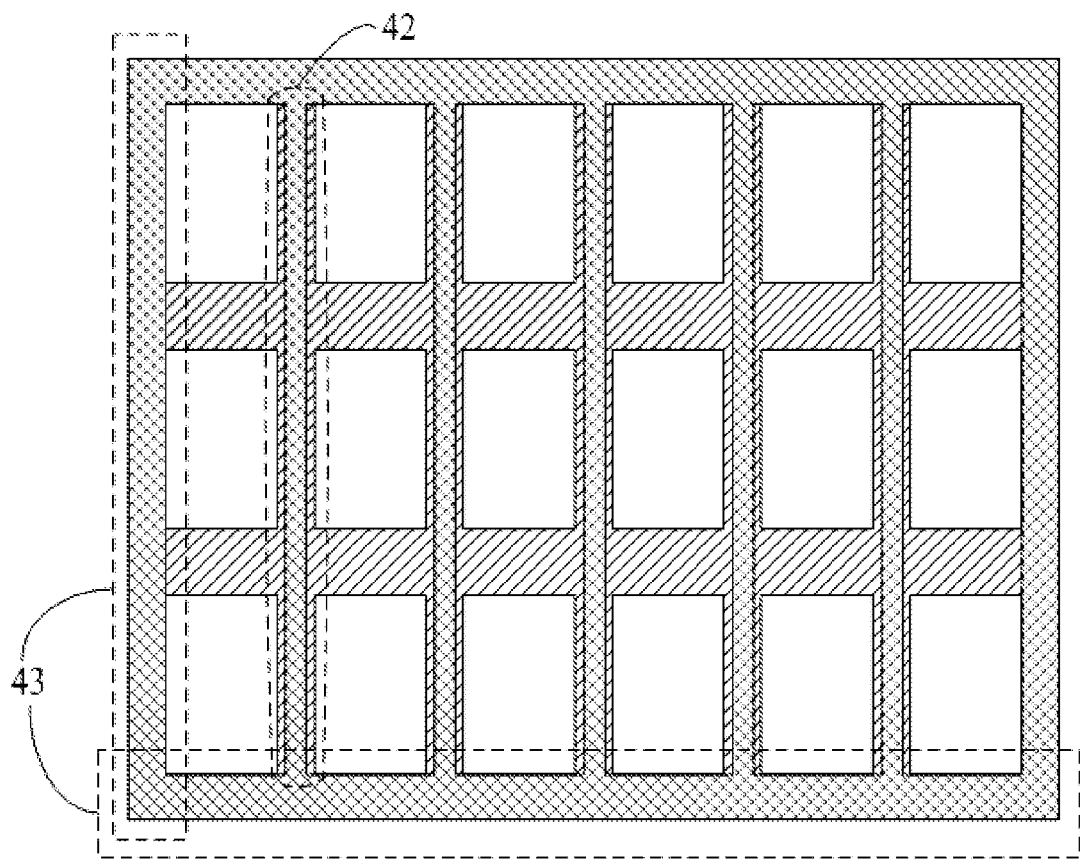
FIG. 6 is another plan view of the color filter substrate according to the second embodiment of the disclosure.

Optionally, as shown in FIG. 1, FIG. 3a and FIG. 6, the black matrix layer 3 includes a third black matrix 33 located in the non-display area. The third black matrix 33 forms a frame.

The electrostatic discharge wire layer 4 further includes a multitude of third electrostatic discharge wires 43 on the third black matrix 33. The third electrostatic discharge wires 43 are located in the non-display area and connected to the third black matrix 33. The second electrostatic discharge wires 42 are connected to the third electrostatic discharge wires 43. Static electricity in the second electrostatic discharge wires 42 may be discharged to the third electrostatic discharge wires 43. Generally, the third electrostatic discharge wires 43 are electrically connected to a ground electrode (not shown in FIGS. 1, 3a and 6). A projection of the third electrostatic discharge wires 43 onto the first substrate 2 is included in a projection of the third black matrix 33 onto the first substrate 2. Furthermore, the second electrostatic discharge wires 42 may be continuous. According to other embodiments, the second electrostatic discharge wires may be discontinuous.

In the color filter substrate 1 according to the embodiment of the disclosure, the electrostatic discharge wire layer 4 is arranged on the black matrix layer 3 of the color filter substrate 1. Hence, the static electricity in the color filter substrate 1 (especially the static electricity in the black matrix layer 3) is discharged via the electrostatic discharge wire layer 4, and accordingly, the static electricity may not be accumulated in the color filter substrate 1, thereby improving the quality and performance of display. In addition, since the electrostatic discharge wire layer is arranged on the black matrix layer rather than other locations, the electrostatic discharge wire layer may not be seen.

A color filter substrate is further provided according to a third embodiment of the disclosure. Same parts of the color filter substrates according to the third embodiment, the first embodiment and the second embodiment are not described here.

Figure 7:
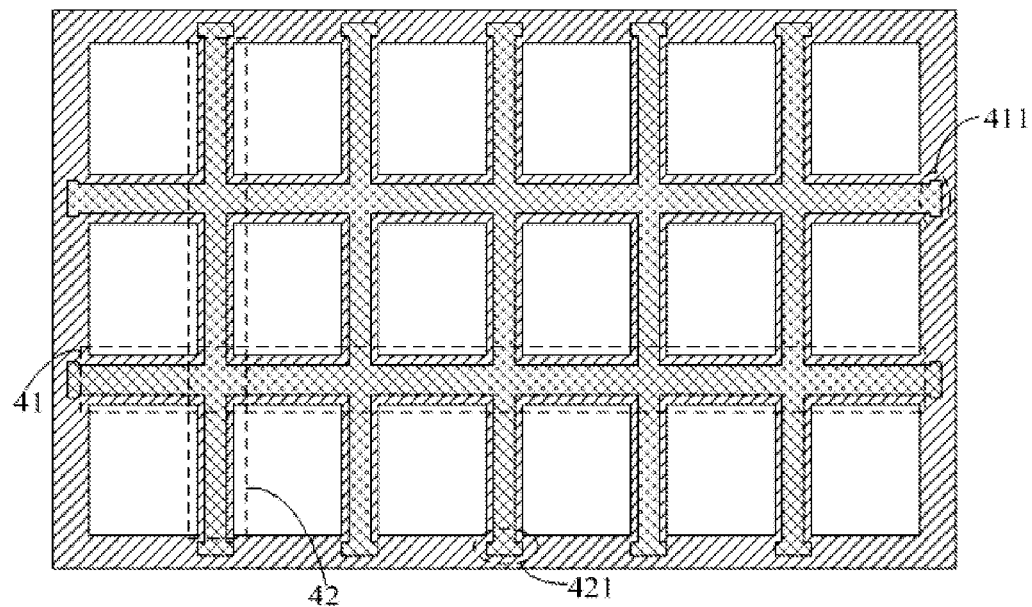
FIG. 7 is a plan view of a color filter substrate according to a third embodiment of the disclosure.

According to the third embodiment, as shown in FIG. 1, FIG. 3a and FIG. 7, the electrostatic discharge wire layer 4 includes first electrostatic discharge wires 41 and second electrostatic discharge wires 42 intersecting with each other. The first electrostatic discharge wires 41 and the second electrostatic discharge wires 42 are located in the display area.

The first electrostatic discharge wires 41 are located on the first black matrix 31 and connected to the first black matrix 31. The first black matrix 31 and the first electrostatic discharge wires 41 are located in the display area 11. The first electrostatic discharge wires 41 are arranged parallel to the first black matrix 31. A projection of the first electrostatic discharge wires 41 onto the first substrate 2 is included in a projection of the first black matrix 31 onto the first substrate 2. The second electrostatic discharge wires 42 are located on the second black matrix 32 and connected to the second black matrix 32. The second black matrix 32 and the second electrostatic discharge wires 42 are located in the display area 11. A projection of the second electrostatic discharge wires 42 onto the first substrate 2 is included in a projection of the second black matrix 32 onto the first substrate 2. The second electrostatic discharge wires 42 are arranged parallel to the second black matrix 32.

Optionally, the electrostatic discharge wire layer 4 further includes first electrostatic discharge terminals 411 connected to the first electrostatic discharge wires 41 and second electrostatic discharge terminals 421 connected to the second electrostatic discharge wires 42. The first electrostatic discharge terminals 411 and the second electrostatic discharge terminals 421 are located in the non-display area. According to the embodiment, static electricity in the color filter substrate 1 may be discharged via the first electrostatic discharge wires 41 and the first electrostatic discharge terminals 411, and may be discharged via the second electrostatic discharge wires 42 and the second electrostatic discharge terminals 421. Generally, the first electrostatic discharge terminals 411 and the second electrostatic discharge terminals 421 are electrically connected to a ground electrode (not shown in FIGS. 1, 3a and 7). In this way, the static electricity may not be accumulated in the color filter substrate 1, thereby improving the performance of a display.

According to the embodiment, each end of each first electrostatic discharge wire 41 is connected to one first electrostatic discharge terminal 411. According to other embodiments, at least one end of the first electrostatic discharge wire 41 is connected to the first electrostatic discharge terminal 411, which is not limited in the disclosure. According to the embodiment, each end of each second electrostatic discharge wire 42 is connected to one second electrostatic discharge terminal 421. According to other embodiments, at least one end of the second electrostatic discharge wire 42 is connected to the second electrostatic discharge terminal 421, which is not limited in the disclosure.

Figure 8:
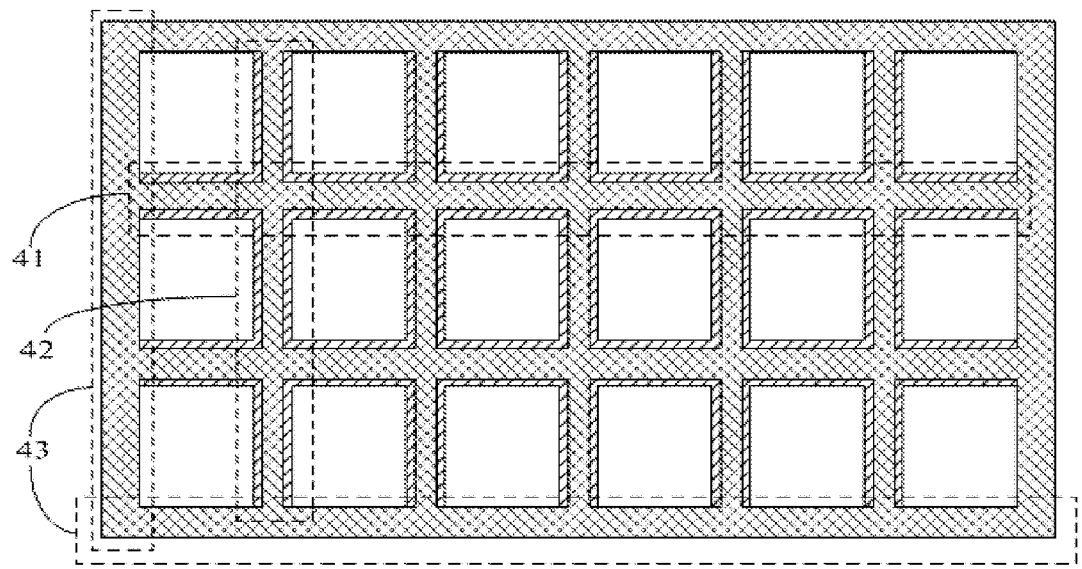
FIG. 8 is another plan view of the color filter substrate according to the third embodiment of the disclosure.
Figure 8A:
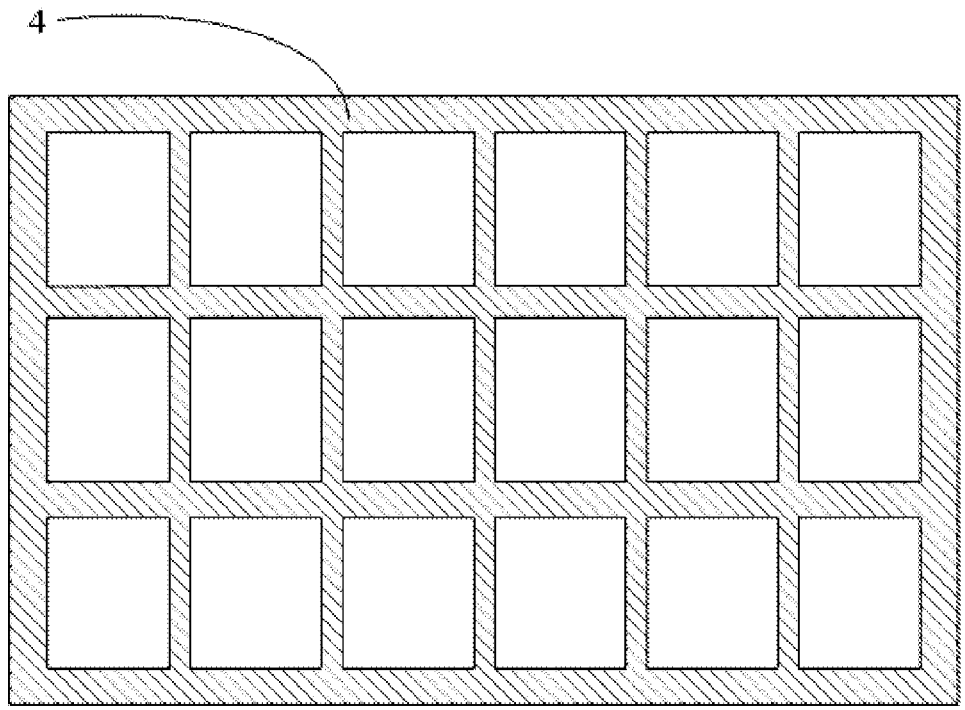
FIG. 8a is a plan view of an electrostatic discharge wire layer of the color filter substrate shown in FIG. 8.

Optionally, as shown in FIG. 1, FIG. 3a and FIG. 8, the black matrix layer 3 further includes a third black matrix 33 located in the non-display area. The electrostatic discharge wire layer 4 further includes third electrostatic discharge wires 43 located on the third black matrix 33. The electrostatic discharge wire layer 4 is located in the non-display area and connected to the third black matrix 33. A projection of the third electrostatic discharge wires 43 onto the first substrate 2 is included in a projection of the third black matrix 33 onto the first substrate 2. In a view of the whole electrostatic discharge wire layer 4, as shown in FIG. 8 and FIG. 8a, the first electrostatic discharge wires 41 and the second electrostatic discharge wires 42 are surrounded by the third electrostatic discharge wires 43, and grids are formed by the first electrostatic discharge wires 41 and the second electrostatic discharge wires 42.

The first electrostatic discharge wires 41 are connected to the third electrostatic discharge wires 43. The second electrostatic discharge wires 42 are connected to the third electrostatic discharge wires 43. Static electricity in the first electrostatic discharge wires 41 and in the second electrostatic discharge wires 42 may be discharged to the third electrostatic discharge wires 43. Generally, the third electrostatic discharge wires 43 are electrically connected to a ground electrode (not shown in FIGS. 1, 3a and 8).

Figure 9:
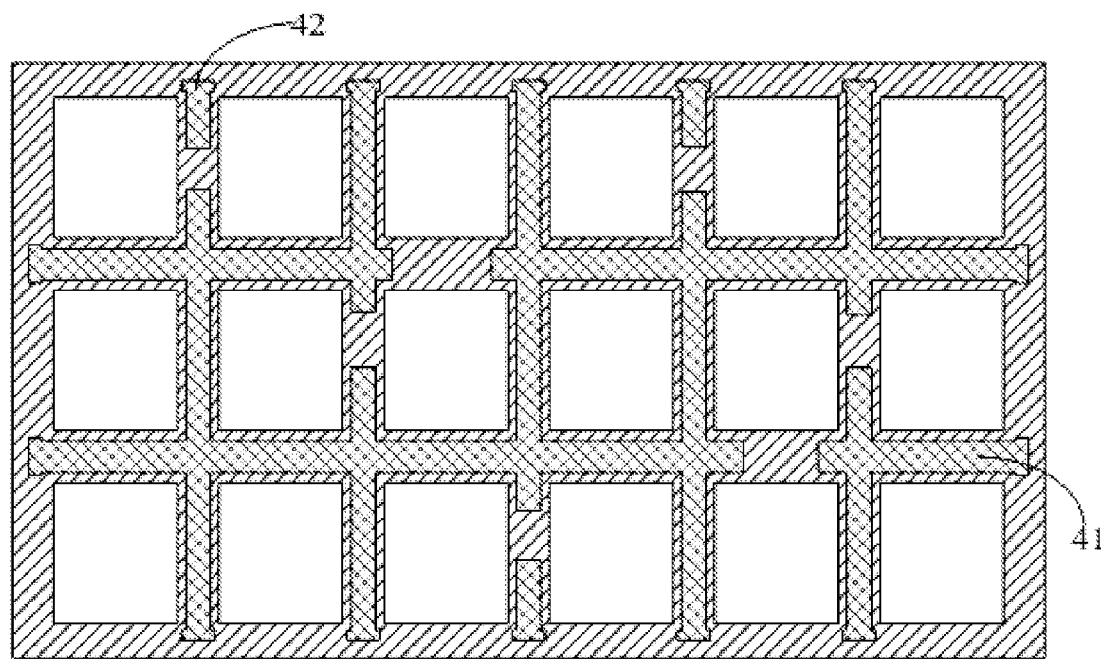
FIG. 9 is further another plan view of the color filter substrate according to the third embodiment of the disclosure.

Furthermore, according to some embodiments, the first electrostatic discharge wires 41 may be continuous. The second continuous discharge wires 42 may be continuous. According to other embodiments, as shown in FIG. 9, the first continuous discharge wires 41 may be discontinuous, and the second electrostatic discharge wires 42 may be discontinuous. Alternatively, one of the first electrostatic discharge wires 41 and the second electrostatic discharge wires 42 may be discontinuous, while the other may be continuous, which is not limited in the disclosure.

In the color filter substrate 1 according to the embodiment of the disclosure, the electrostatic discharge wire layer 4 is arranged on the black matrix layer 3 of the color filter substrate 1. Hence, the static electricity in the color filter substrate 1 (especially the static electricity in the black matrix layer 3) is discharged via the electrostatic discharge wire layer 4, and accordingly, the static electricity may not be accumulated in the color filter substrate 1, thereby improving the quality and performance of display.

A color filter substrate is further provided according to a fourth embodiment of the disclosure. Same parts of the color filter substrates according to the fourth embodiment and according to the third embodiment are not described here.

Figure 10:
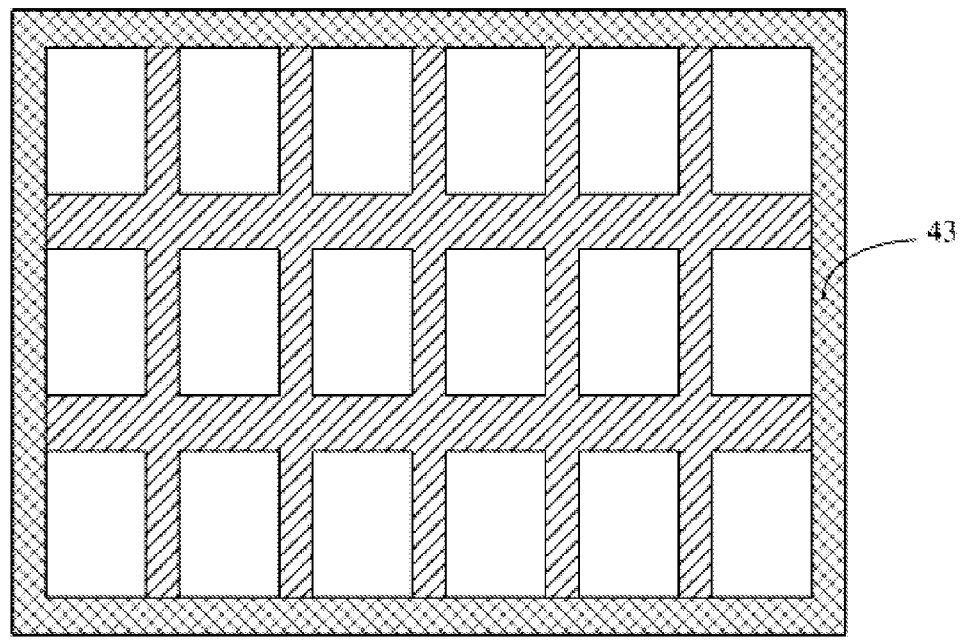
FIG. 10 is a plan view of a color filter substrate according to a fourth embodiment of the disclosure.

As shown in FIG. 1 and FIG. 10, the black matrix layer 3 includes a third black matrix 33 located in the non-display area. The electrostatic discharge wire layer 4 includes third electrostatic discharge wires 43 located on the third black matrix 33. The third electrostatic discharge wires 43 is located in the non-display area and connected to the third black matrix 33. A projection of the third electrostatic discharge wires 43 onto the first substrate is included in a projection of the third black matrix 33 onto the first substrate. Generally, the third black matrix 33 forms a frame, and the third electrostatic discharge wires 43 may also form a frame. The third electrostatic discharge wires 43 may form a closed frame or an unclosed frame, which is not limited in the disclosure.

Generally, the third electrostatic discharge wires 43 are electrically connected to a ground electrode (not shown in FIGS. 1 and 10). Thus, static electricity in the color filter substrate 1 may be discharged via the third electrostatic discharge wires 43, thereby improving the performance of a display.

In the color filter substrate according to the embodiment of the disclosure, the electrostatic discharge wire layer 4 is arranged on the black matrix layer 3 of the color filter substrate. Hence, the static electricity in the color filter substrate (especially the static electricity in the black matrix layer 3) is discharged via the electrostatic discharge wire layer 4, and accordingly, the static electricity may not be accumulated in the color filter substrate, thereby improving the quality and performance of display.

Figure 11:
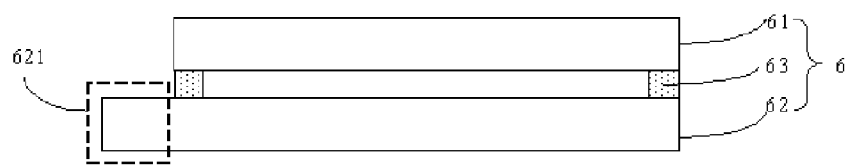
FIG. 11 is a plan view of a display panel according to a fifth embodiment of the disclosure.

A display panel is further provided according to a fifth embodiment of the disclosure. As shown in FIG. 11, the display panel 6 includes: a color filter substrate 61, a TFT array substrate 62 arranged facing the color filter substrate 61, and a junction layer 63 provided between the TFT array substrate 62 and the color filter substrate 61. The junction layer 63 is connected to the electrostatic discharge wire layer. The color filter substrate 61 may be provided according to any one of the foregoing embodiments.

Figure 12:
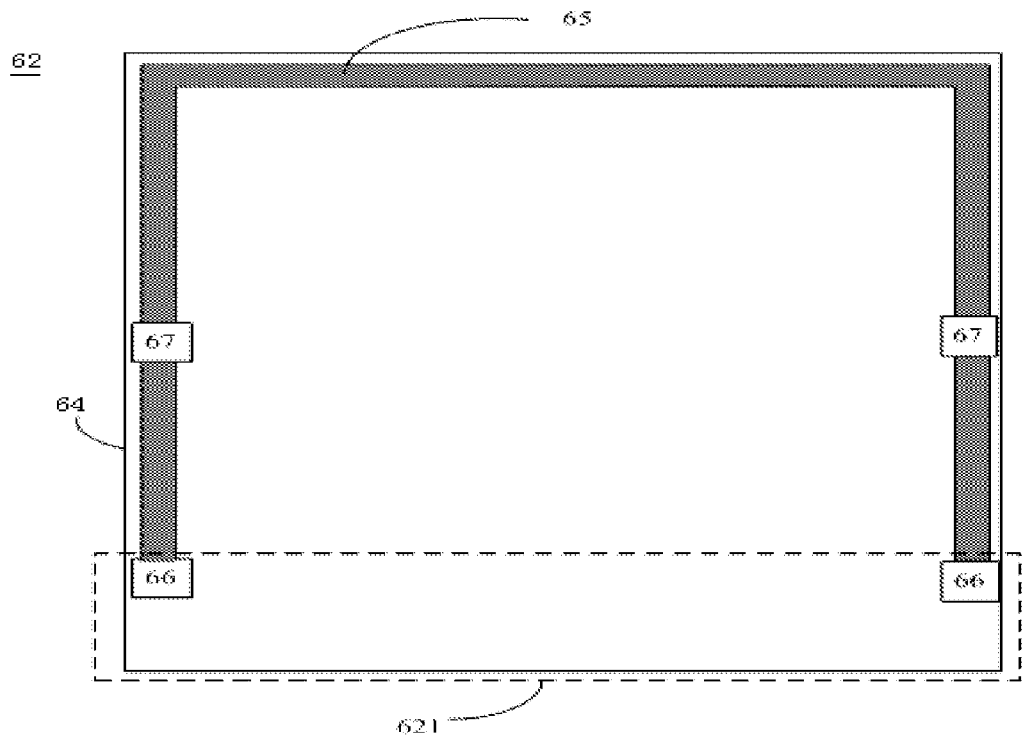
FIG. 12 is a schematic structural diagram of a TFT array substrate according to the fifth embodiment of the disclosure.

Furthermore, as shown in FIG. 11 and FIG. 12, the TFT array substrate 62 includes a second substrate 64, a conductive layer (not shown in FIGS. 11 and 12) located on the second substrate 64, a gate insulating layer (not shown in FIGS. 11 and 12) located on the second substrate 64, and a passivation layer (not shown in FIGS. 11 and 12) located on the gate insulating layer. The conductive layer may be a gate layer, a source/drain layer, a pixel electrode layer or a common electrode layer. The TFT array substrate 62 further includes a grounding wire 65 located in a non-display area of the TFT array substrate 62. A position of the grounding wire 65 on the second substrate 64 matches a position of the third electrostatic discharge wires on the first substrate. The electrostatic discharge wire layer is connected to the grounding wire 65 via the junction layer 63 to discharge static electricity. The grounding wire 65 is located in the conductive layer. The grounding wire 65 is connected to the junction layer 63 via a hole penetrating through the gate insulating layer and the passivation layer, in the case that the conductive layer is the gate layer. The grounding wire 65 is connected to the junction layer 63 via a hole penetrating through the passivation layer, in the case that the conductive layer is the source/drain layer. In other words, the conductive layer is electrically connected to the junction layer 63, i.e., the grounding wire 65 is electrically connected to the junction layer 63. Generally, the junction layer 63 has a shape of a frame and is located in the non-display area. At least one end of the grounding wire 65 is connected to a testing terminal 66 (generally located on a step 621 of the TFT array substrate). Furthermore, the TFT array substrate 62 may further includes a connection terminal 67 located at an area of the grounding wire 65 besides the area of the testing terminal 66, in other words, the projection of the connection terminal 67 onto the TFT array substrate 62 is not at the area of the step 621. The grounding wire 65 is electrically connected to the junction layer 63 through the connection terminal 67, and the junction layer 63 is connected to the electrostatic discharge wire layer. Thus, the grounding wire 65 is electrically connected to the electrostatic discharge wire layer, and accordingly, static electricity in the color filter substrate is discharged to the grounding wire 65 via the electrostatic discharge wire layer, and the static electricity may not be accumulated in the color filter substrate, thereby improving the quality and performance of display. It should be noted that, a location of the connection terminal 67 onto the TFT array substrate 62 is not limited in the disclosure. The connection terminal 67 may be arranged, by those skilled in the art based on actual requirements, at any location at the grounding wire 65, with a projection onto the TFT array substrate 62 different from the step 621.

Furthermore, the junction layer 63 may be made of anisotropic conductive adhesive, silver epoxy or conductive gold balls. In the case that the junction layer 63 is made of the conductive gold balls, the conductive gold balls are distributed in a seal (seal frame). A density of the conductive gold balls ranges from $1/30000$ per um$^2$ to 0.02 per um$^2$.

Generally, the display panel 6 further includes the testing terminal 66 (generally located at the step 621 of the TFT array substrate) for testing the display performance of the display panel 6 (also called a Visual Test). The testing terminal 66 is electrically connected to the grounding wire 65, so that a test fixture (generally connected to the testing terminal 66 through a probe) and the display panel 6 are co-grounded.

The TFT array substrate according to the embodiment of the disclosure may be an amorphous silicon (A-Si) TFT array substrate, a Low Temperature Poly-silicon (LTPS) TFT array substrate, or an oxide TFT array substrate, which is not limited in the disclosure.

In the display panel according to the embodiment of the disclosure, the electrostatic discharge wire layer is arranged on the black matrix layer of the color filter substrate. Hence, the static electricity in the color filter substrate (especially the static electricity in the black matrix layer) is discharged via the electrostatic discharge wire layer, and accordingly, the static electricity may not be accumulated in the color filter substrate, thereby improving the quality and performance of display.

Figure 13:
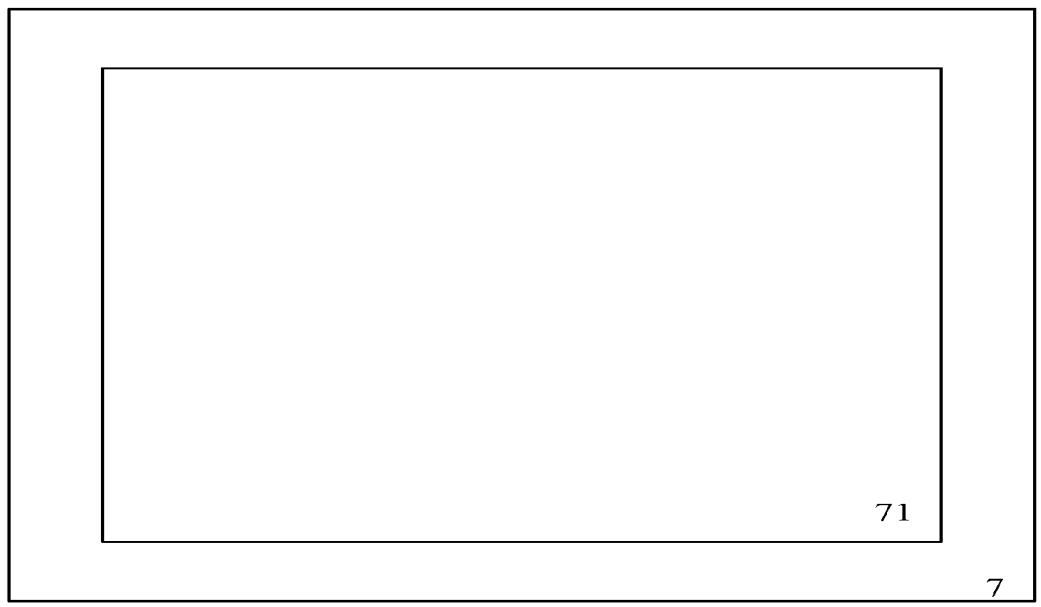
FIG. 13 is a schematic structural diagram of a display device according to a sixth embodiment of the disclosure.

A display device is further provided according to a sixth embodiment of the disclosure. As shown in FIG. 13, the display device 7 includes a display panel 71 according to the fifth embodiment.

Furthermore, the display device 7 includes an iron frame (not shown in FIG. 13). The electrostatic discharge wire layer is connected to the iron frame to discharge static electricity. The static electricity in the color filter substrate is transmitted to the iron frame via the electrostatic discharge wire layer, and then discharged via the iron frame. Generally, the iron frame is located in a backlight module (not shown in FIG. 13) of the display device 7, while the iron frame is not limited in the disclosure.

The display device according to the embodiment of the disclosure may be an in-cell touch display device or an on-cell touch display device, which is not limited in the disclosure.

The display device according to the embodiment is not limited to an Organic Light-Emitting Diode display (OLED), an electronic paper or a liquid crystal display device. The liquid crystal display device may be a Twisted Nematic (TN) liquid crystal display device, an In-Plane Switching (IPS) liquid crystal display device or a Fringe Field Switching (FFS) liquid crystal display device, which is not limited in the disclosure.

In summary, in the color filter substrate, the display panel and the display device according to the embodiments of the disclosure, the electrostatic discharge wire layer is arranged on the black matrix layer of the color filter substrate. Hence, the static electricity in the color filter substrate (especially the static electricity in the black matrix layer) is discharged via the electrostatic discharge wire layer, and accordingly, the static electricity may not be accumulated in the color filter substrate, thereby improving the quality and performance of display.

The above-described embodiments are only preferred embodiments of the disclosure. It should be noted that, improvements and modifications may be made by those skilled in the art without departing from the principle of the disclosure. Those improvements and modifications should also fall within the scope of protection of the disclosure.

What is claimed is:

1. A display panel, comprising:
 a color filter substrate, wherein the color filter substrate comprises:
  a first substrate,
  a black matrix layer located on the first substrate, and
  an electrostatic discharge wire layer located on the black matrix layer and connected to the black matrix layer;
 a TFT array substrate arranged facing the color filter substrate, wherein the TFT array substrate comprises a second substrate and a grounding wire located in a non-display area of the TFT array substrate; and
 a junction layer arranged between the TFT array substrate and the color filter substrate, wherein the junction layer is connected to the electrostatic discharge wire layer; and
 wherein the electrostatic discharge wire layer is electrically connected to the grounding wire via the junction layer, and at least one end of the grounding wire is connected to a testing terminal located on a step of the TFT array substrate, the testing terminal providing a connection interface fit for a test fixture for testing a display performance of the display panel.

2. The display panel according to claim 1, wherein a location of the grounding wire on the second substrate matches a location of a portion of the electrostatic discharge wires layer in the non-display area of the TFT array substrate.

3. The display panel according to claim 2, wherein the TFT array substrate further comprises:
 a conductive layer located on the second substrate,
 a gate insulating layer located on the second substrate, and
 a passivation layer located on the gate insulating layer;
 wherein the grounding wire is located in the conductive layer.

4. A display device comprising a display panel, wherein the display panel comprises:
 a color filter substrate, wherein the color filter substrate comprises:
  a first substrate,
  a black matrix layer located on the first substrate, and
  an electrostatic discharge wire layer located on the black matrix layer and connected to the black matrix layer;
 a TFT array substrate arranged facing the color filter substrate, wherein the TFT array substrate comprises a second substrate and a grounding wire located in a non-display area of the TFT array substrate; and
 a junction layer arranged between the TFT array substrate and the color filter substrate, wherein the junction layer is connected to the electrostatic discharge wire layer; and
 wherein the electrostatic discharge wire layer is electrically connected to the grounding wire via the junction layer, and at least one end of the grounding wire is connected to a testing terminal located on a step of the TFT array substrate, the testing terminal providing a connection interface fit for a test fixture for testing a display performance of the display panel.

5. The display device according to claim 4, further comprising an iron frame, wherein the electrostatic discharge wire layer is connected to the iron frame to discharge static electricity.

* * * * *